US011812284B2

(12) United States Patent
Tullberg et al.

(10) Patent No.: US 11,812,284 B2
(45) Date of Patent: Nov. 7, 2023

(54) PROVISION OF RADIO COVERAGE IN A WIRELESS COMMUNICATION NETWORK FOR SERVING WIRELESS COMMUNICATION DEVICES

(71) Applicant: Telefonaktiebolaget LM Ericsson (publ), Stockholm (SE)

(72) Inventors: Hugo Tullberg, Nyköping (SE); Johan Ottersten, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 367 days.

(21) Appl. No.: 17/422,286

(22) PCT Filed: Jan. 21, 2019

(86) PCT No.: PCT/SE2019/050037
§ 371 (c)(1),
(2) Date: Jul. 12, 2021

(87) PCT Pub. No.: WO2020/153880
PCT Pub. Date: Jul. 30, 2020

(65) Prior Publication Data
US 2022/0095130 A1 Mar. 24, 2022

(51) Int. Cl.
*H04W 24/02* (2009.01)
*H04W 16/30* (2009.01)
(Continued)

(52) U.S. Cl.
CPC ........... *H04W 24/02* (2013.01); *H04W 16/30* (2013.01); *H04W 64/006* (2013.01); *H04W 84/005* (2013.01)

(58) Field of Classification Search
CPC . H04W 24/02; H04W 64/006; H04W 84/005; H04W 36/32; H04W 52/0206; H04W 64/00; H04W 36/08
See application file for complete search history.

(56) References Cited

U.S. PATENT DOCUMENTS 6,473,412 B1 * 10/2002 Haartsen ............... H04W 48/14
455/437
10,616,859 B2 * 4/2020 Lei .......................... H04W 4/90
(Continued)

FOREIGN PATENT DOCUMENTS

EP 2852204 A1 3/2015

OTHER PUBLICATIONS

International Search Report and Written Opinion dated Oct. 4, 2019 for International Application No. PCT/SE2019/050037 filed Jan. 21, 2019, consisting of 11—pages.

*Primary Examiner* — Minjung Kim
(74) *Attorney, Agent, or Firm* — Christopher & Weisberg. P.A.

(57) ABSTRACT

First node(s) obtains first information relating to current locations of the wireless communication devices that are currently served by a first set of radio network nodes of the wireless communication network, located at first locations, respectively. The first node(s) determines, based on the obtained first information, different, second locations of a second set of radio network nodes for continued serving of the wireless communication devices instead of by the first set at the first locations. The first node(s) initiates activation of the second set of radio network nodes at the second locations, to thereby provide radio coverage for the continued serving.

20 Claims, 7 Drawing Sheets

(51) Int. Cl.
*H04W 64/00* (2009.01)
*H04W 84/00* (2009.01)

(56) References Cited

U.S. PATENT DOCUMENTS

| | | | |
|---|---|---|---|
| 2011/0149789 A1* | 6/2011 | Edge | H04W 48/16 |
| | | | 370/252 |
| 2013/0244692 A1* | 9/2013 | Kelly | G01S 5/14 |
| | | | 455/456.1 |
| 2015/0103717 A1* | 4/2015 | Awoniyi | H04W 52/0212 |
| | | | 370/311 |
| 2015/0126209 A1 | 5/2015 | Gloss | |
| 2015/0327043 A1 | 11/2015 | Das et al. | |
| 2018/0041256 A1 | 2/2018 | Schmidt et al. | |
| 2018/0076878 A1 | 3/2018 | Ryu et al. | |
| 2018/0167775 A1 | 6/2018 | Tian et al. | |
| 2021/0400485 A1* | 12/2021 | Ergen | G06F 16/9537 |
| 2022/0159476 A1* | 5/2022 | Nakahira | H04W 24/02 |
| 2023/0187808 A1* | 6/2023 | Jian | H01Q 1/1257 |
| | | | 370/328 |

* cited by examiner

PROVISION OF RADIO COVERAGE IN A WIRELESS COMMUNICATION NETWORK FOR SERVING WIRELESS COMMUNICATION DEVICES

CROSS-REFERENCE TO RELATED APPLICATIONS

This application is a Submission Under 35 U.S.C. § 371 for U.S. National Stage Patent Application of International Application Number: PCT/SE2019/050037, filed Jan. 21, 2019 entitled "PROVISION OF RADIO COVERAGE IN A WIRELESS COMMUNICATION NETWORK FOR SERVING WIRELESS COMMUNICATION DEVICES," the entirety of which is incorporated herein by reference.

TECHNICAL FIELD

Embodiments herein concern a method and arrangements relating to provision of radio coverage in a wireless communication network, e.g. telecommunication network, for serving wireless communication devices and adaptation of this radio coverage for continued serving of the wireless communication devices.

BACKGROUND

Communication devices such as wireless communication devices, that simply may be named wireless devices, may also be known as e.g. user equipments (UEs), mobile terminals, wireless terminals and/or mobile stations. A wireless device is enabled to communicate wirelessly in a wireless communication network, wireless communication system, or radio communication system, e.g. a telecommunication network, sometimes also referred to as a cellular radio system, cellular network or cellular communication system. The communication may be performed e.g. between two wireless devices, between a wireless device and a regular telephone and/or between a wireless device and a server via a Radio Access Network (RAN) and possibly one or more core networks, comprised within the cellular communication network. The wireless device may further be referred to as a mobile telephone, cellular telephone, laptop, Personal Digital Assistant (PDA), tablet computer, just to mention some further examples. Wireless devices may be so called Machine to Machine (M2M) devices or Machine Type of Communication (MTC) devices, i.e. devices that are not associated with a conventional user.

The wireless device may be, for example, portable, pocket-storable, hand-held, computer-comprised, or vehicle-mounted mobile device, enabled to communicate voice and/or data, via the RAN, with another entity, such as another wireless device or a server.

The wireless communication network may cover a geographical area which is divided into cell areas, wherein each cell area is served by at least one base station, or Base Station (BS), e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is typically identified by one or more cell identities. The base station at a base station site may provide radio coverage for one or more cells. A cell is thus typically associated with a geographical area where radio coverage for that cell is provided by the base station at the base station site. Cells may overlap so that several cells cover the same geographical area. By the base station providing or serving a cell is typically meant that the base station provides radio coverage such that one or more wireless devices located in the geographical area where the radio coverage is provided may be served by the base station in said cell. When a wireless device is said to be served in or by a cell this implies that the wireless device is served by the base station providing radio coverage for the cell. One base station may serve one or several cells. Further, each base station may support one or several communication technologies. The base stations communicate over the air interface operating on radio frequencies with the wireless device within range of the base stations.

In some RANs, several base stations may be connected, e.g. by landlines or microwave, to a radio network controller, e.g. a Radio Network Controller (RNC) in Universal Mobile Telecommunication System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communication (originally: Groupe Spécial Mobile), which may be referred to as 2nd generation or 2G.

UMTS is a third generation mobile communication system, which may be referred to as 3rd generation or 3G, and which evolved from the GSM, and provides improved mobile communication services based on Wideband Code Division Multiple Access (WCDMA) access technology. UMTS Terrestrial Radio Access Network (UTRAN) is essentially a radio access network using wideband code division multiple access for wireless devices. High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Such networks may be named WCDMA/HSPA.

The expression downlink (DL) may generally be used for the transmission path from the wireless communication network, e.g. base station thereof, to the wireless device. The expression uplink (UL) may be used for the transmission path in the opposite direction i.e. from the wireless device to the wireless communication network, e.g. base station thereof.

In 3rd Generation Partnership Project (3GPP) Long Term Evolution (LTE), base stations, which may be referred to as eNodeBs or eNBs, may be directly connected to other base stations and may be directly connected to one or more core networks. LTE may be referred to as 4th generation or 4G.

The 3GPP has undertaken to evolve further the UTRAN and GSM based radio access network technologies, for example into evolved UTRAN (E-UTRAN) used in LTE.

Work is ongoing with developing a next generation wide area networks, which may be referred to as NeXt generation (NX), New Radio (NR), or fifth generation (5G).

In future cellular wireless communication networks, such as 5G, cell shaping technologies will be important for improved coverage and user throughput, especially at the cell edge. Further, new frequency bands are explored for a wider spectrum range to meet a high demand for high data-rate communications. Conventional hexagonal-shaped and large cell deployments will no longer work well due to deteriorated propagation conditions at higher frequencies. New technologies are tending towards smaller cells that are flexible in shape and able to adapt to user positions and traffic demands. There are for example techniques for improving throughput and coverage at the cell edge by using for example machine learning and other cell shaping techniques in order to modify the antenna radiation pattern.

SUMMARY

In view of the above, an object is to provide one or more improvements in relation to the prior art, such as to facilitate adaptive provision of radio coverage for serving wireless communication devices in a wireless communication network.

According to a first aspect of embodiments herein, the object is achieved by a method, performed by one or more first nodes, for providing radio coverage in a wireless communication network for serving wireless communication devices. The first node(s) obtains first information relating to current locations of the wireless communication devices that are currently served by a first set of radio network nodes of the wireless communication network. The radio network nodes of the first set are located at first locations, respectively. The first node(s) determines, based on the obtained first information, second locations of a second set of radio network nodes for continued serving of the wireless communication devices instead of by the first set at the first locations. The second locations differing at least partly from the first locations. The first node(s) initiates activation of the second set of radio network nodes at said second locations, to thereby provide radio coverage for said continued serving.

According to a second aspect of embodiments herein, the object is achieved by a computer program comprising instructions that when executed by a processing circuit causes the first node(s) to perform the method according to the first aspect.

According to a third aspect of embodiments herein, the object is achieved by a carrier comprising the computer program according to the second aspect.

According to a fourth aspect of embodiments herein, the object is achieved by one or more first nodes for providing radio coverage in a wireless communication network for serving wireless communication devices. The first node(s) is configured to obtain first information relating to current locations of the wireless communication devices that are currently served by a first set of radio network nodes of the wireless communication network. The radio network nodes of the first set are located at first locations, respectively. The first node(s) is further configured to determine, based on the obtained first information, second locations of a second set of radio network nodes for continued serving of the wireless communication devices instead of by the first set at the first locations. The second locations differ at least partly from the first locations. Moreover, the first node(s) is configured to initiate activation of the second set of radio network nodes at said second locations, to thereby provide radio coverage for said continued serving.

Advantageously, to facilitate implementation and determination of the second locations for continued serving, an algorithm is used for the determination and that is preferably based on forming clusters of the wireless communication devices by associating the wireless devices with locations, respectively, related to radio network nodes available for the second set. The second locations may be determined using centroids of the formed clusters, respectively.

Embodiments herein offer a very flexible way of providing radio coverage that can adapt very well to varying traffic demands and traffic load in an area, without of having to rely only on only conventional cell shaping techniques. Instead, or additionally, the locations from where wireless communication devices are served are changed and may adapt to a current, e.g. temporal, situation regarding wireless communication devices that shall be served in the area. The method described herein can advantageously be used with mobile radio network nodes, such as base stations, as supplement to conventional stationary base stations, i.e. at fix locations. The mobile radio network nodes may e.g. moved by means of Unmanned Air Vehicles, UAVs, also known as drones, or in principle by any kind of vehicle to second locations for continued serving. Embodiments herein can also be used with so called Ultra Dense Networks (UDN) of radio network nodes, where activation and practical change of radio network nodes involved to second locations for continued serving can be accomplished by activating, possibly combined with deactivating, radio network nodes of the UDN.

BRIEF DESCRIPTION OF THE DRAWINGS

Examples of embodiments herein are described in more detail with reference to the appended schematic drawings, which are briefly described in the following.

DETAILED DESCRIPTION

Figure 1A:
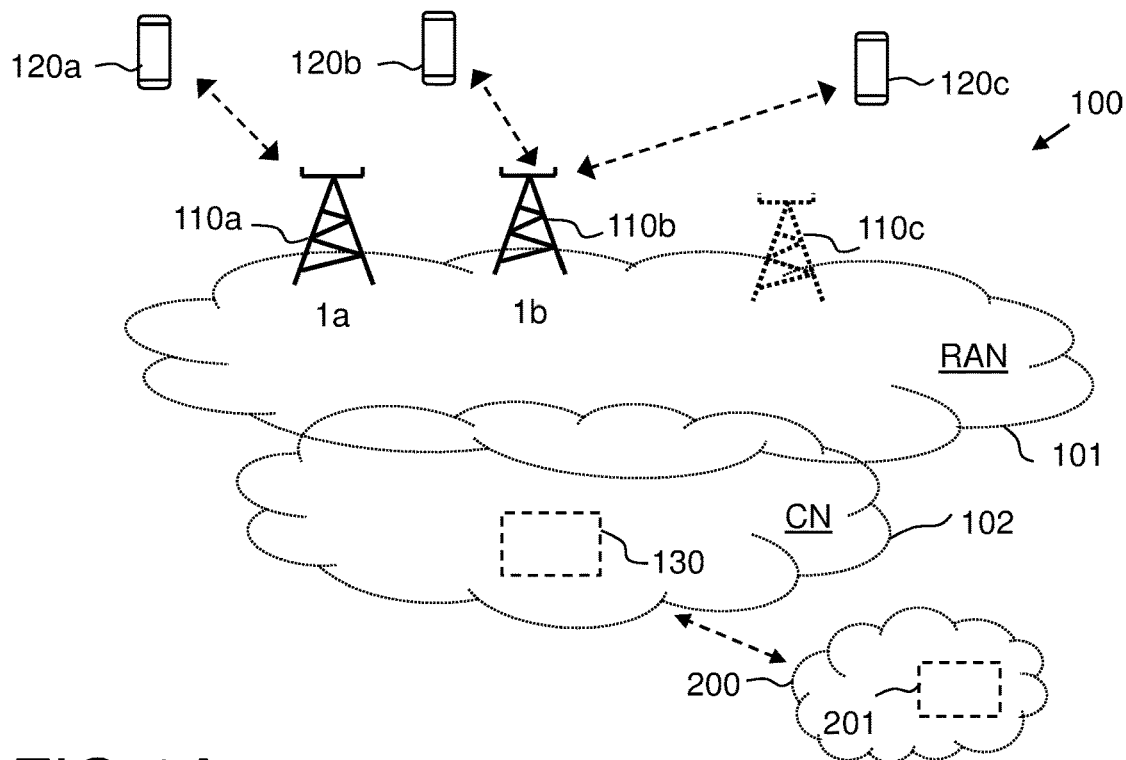
FIG. 1A is a block diagram schematically depicting a wireless communication network to be used for discussing embodiments herein with radio network nodes at first locations.

Throughout the following description similar reference numerals may be used to denote similar elements, units, modules, circuits, nodes, parts, items or features, when applicable. Features that appear only in some embodiments of what is shown in a figure, are typically indicated by dashed lines in the drawings.

In the following, embodiments herein are illustrated by exemplary embodiments. It should be noted that these embodiments are not necessarily mutually exclusive. Components from one embodiment may be tacitly assumed to be present in another embodiment and it will be obvious to a person skilled in the art how those components may be used in the other exemplary embodiments.

As a development towards embodiments herein, the situation indicated in the Background will first be further elaborated upon.

The prior art technologies indicated in the Background are limited by fixed base station locations and fixed antenna positions. The antennas are further limited in terms of possible radiation patterns. The antennas typically have a horizontal and vertical tilt which means that they can only alter the cell shape to some extent.

Current and near-future cell shaping strategies rely on small changes to the antenna radiation pattern at the base station. In current high-tower deployments this is done by tilting the antenna. In future wireless systems, more flexibility than this is desirable to be introduced to cope with fast changing traffic demands and user locations and thereby be able to allow and ensure high data rate communication and coverage for all users. Especially users at cell edges cause problems in current systems. With the anticipated smaller cells, as indicated in the Background, the height of the antennas will typically be lower, the tilting approach become less useful and is expected not be sufficient.

Embodiments herein, as will be explained in the following, are based on the idea of changing location, i.e. position, of base stations that serve UEs, e.g. by using mobile base stations that can change their location depending on UE positions and traffic demand. Embodiment herein provides flexible provision of radio coverage to enable desirable or needed cell shaping. For example to be able to ensure high data rate communication and coverage for all users in a future network scenario, also at the cell edges, and enable to utilize resources more flexible and efficiently, less need of overprovisioning network resources to handle temporary demands etc.

FIG. 1A is a block diagram schematically depicting a wireless communication network 100 to be used for discussing and exemplifying embodiments herein, and in which embodiments herein may be implemented.

The wireless communication network 100 may comprise a Radio Access Network (RAN) 101 part and a Core Network (CN) 102 part. The wireless communication network 100 may be a telecommunication network or system, such as a cellular communication network that supports at least one Radio Access Technology (RAT), e.g. LTE, or 4G, and/or New Radio (NR) that also may be referred to as 5G, or even further generations, but could also be another type of wireless communication network, e.g. a so-called WiFi network.

The wireless communication network 100 typically comprises network nodes that are communicatively interconnected. The network nodes may be logical and/or physical and are located in one or more physical devices. The wireless communication network 100, typically the RAN 101, comprise radio network nodes 110a-b, and may further comprise a radio network node 110c. The radio network nodes are or comprise radio transmitting network nodes, such as base stations and/or are or comprises controlling nodes that control one or more radio transmitting network nodes. The radio network node 110a-c are configured to serve and/or control and/or manage one or more wireless communication devices. Each radio network node may provide one or more radio coverage areas, i.e. areas where radio coverage is provided to enable communication with one or more wireless communication devices. A wireless communication device may alternatively be named a wireless device and it may correspond to a User Equipment (UE). Each radio coverage may be provided by and/or associated with a particular Radio Access Technology (RAT). Each radio coverage area may correspond to a so called cell or a radio beam, that simply may be named a beam. As should be recognized by the skilled person, a beam is a more dynamic and relatively narrow and directional radio coverage compared to a conventional cell, and may be accomplished by so called beamforming. A beam is typically for serving one or a few communication devices at the same time, and may be specifically set up for serving this one or few communication devices. The beam may be changed dynamically by beamforming to provide desirable coverage for the one or more communication devices being served by the beam. There may be more than one beam provided by one and the same radio network node.

Said radio network nodes may e.g. be communicatively connected, such as configured to communicate, over, or via, a certain communication interface and/or communication link.

Further, the wireless communication network 100, or rather the CN 202, may comprise one or more core network nodes, e.g. a core network node 130, such as a serving gateway, that may be communicatively connected, such as configured to communicate, over, or via, a communication interface and/or communication link, with radio network nodes of the RAN 201, e.g. with the radio network nodes 110a-c.

The figure also shows wireless communication devices 120a-c that in the shown view are currently served by a first set of radio network nodes that are the radio network nodes 110a, 110b.

The figure also shows a further node 201 and a further network 200. The further node 201 may be located outside the wireless communication network 100, i.e. be an external node, as indicated in the figure, or alternatively (not indicated in the figure) be comprised in the wireless communication network 100 and thus be a network node thereof, e.g. a management node thereof. The further network node 130 may in principle be any node communicatively connected to the wireless communication network 100.

Likewise, the further network 200 may be located outside the wireless communication network 100, i.e. be an external network, as indicated in the figure, e.g. corresponding to a so-called computer cloud, often simply referred to as cloud, that may provide and/or implement services and/or functions for and/or relating to the wireless communication network 100. The further network 200 may alternatively (not indicated in the figure) be comprised in the wireless communication network 100 and thus e.g. correspond to a subnetwork thereof. It is implied that a network and the further network 200 comprises interconnected network nodes and may e.g.

include the further node 130 as indicated in the figure. The further network 200 may in principle be any network communicatively connected to the wireless communication network.

In the shown view, the wireless communication devices 120a-c are currently served by a first set of radio network nodes that are the radio network nodes 110a, 110b. The radio network nodes 110a, 110b of the first set are located at first locations 1a, 1b, respectively. More specifically, the radio network node 110a is at location 1a and serves the wireless communication device 120a, and the radio network node 110b is at location 1b and serves the wireless communication devices 120a-c.

Figure 1B:
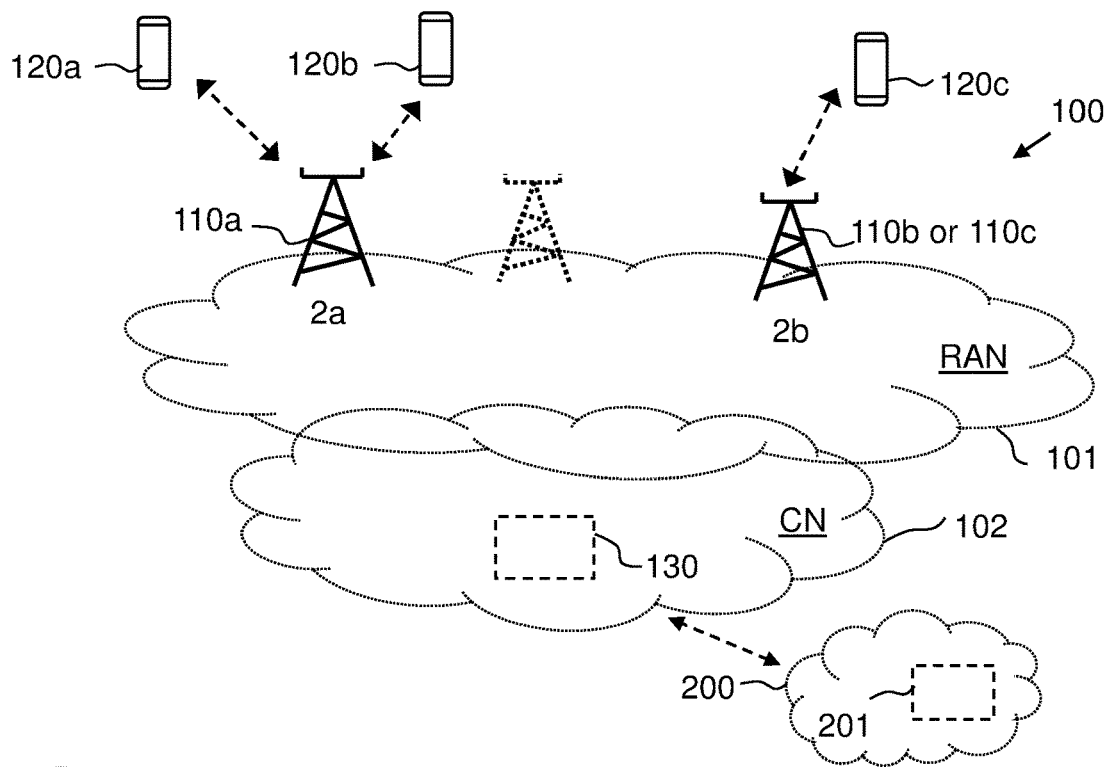
FIG. 1B is a block diagram schematically depicting the wireless communication network of FIG. 1A but with radio network nodes at second locations.

FIG. 1B is a block diagram schematically depicting the wireless communication network 100 of FIG. 1A but with radio network nodes serving the wireless communication devices 120a-c at second locations 2a, 2b instead at the first locations 1a, 1b. The wireless communication devices 120a-c are shown at same, or substantially the same positions as in FIG. 1A, e.g. due to that they are stationary and/or that they remain, or can be assumed to remain, for some other reason at the same location.

The radio network node 110a is at the same location, i.e. the second location 2a is the same as the first location 1a. There is no longer any active radio network node at position 1a from where radio network node 110b in FIG. 1A was serving wireless communication devices 120b-c. The reason may be that the radio network 110b has been switched off at location 1b or moved away. Instead there is now a radio network node at the location 2b. The radio network node at location 2b may the radio network node 110b that has moved to location 2b from location 1b, or may e.g. be another radio network node, e.g. radio network node 110c, that has been activated, e.g. switched on at and/or moved to, location 2b.

The radio network node at location 2b now serves wireless communication device 120c that before was served from location 1b. As also seen in the figure, the wireless communication device 120b is served by the wireless communication device 110a that is also still serving wireless communication device 120a.

The change in FIG. 1B compared to FIG. 1A cause change in, or adaptation of, the provided radio coverage for serving the wireless device 120a-c. The adaptation should of course preferably result in an improvement for serving the wireless communication devices. For example, in FIG. 1A the wireless device 120c may be at poor radio coverage and exhibit low data rates and/or large delays since it is relatively far away from the radio network node 110b serving it. In FIG. 1B, there is continued serving of the same wireless devices 120a-c by the same number of radio network nodes, but the wireless devices 120a-c are served by radio network nodes that that are closer and thereby able to provide improved serving and thereby improved performance for the wireless communication devices 120a-c. Note that it instead e.g. could be an additional radio network node in FIG. 1B for serving the wireless communication devices 120a-c, e.g. in order to improve performance by adding capacity so that each radio network node can serve both fewer wireless communication devices and at closer range.

Attention is drawn to that FIGS. 1A-B are only schematic and for exemplifying purpose and that not everything shown in the figure may be required for all embodiments herein, as should be evident to the skilled person. Also, a wireless communication network or networks that correspond(s) to the wireless communication network 100, will typically comprise several further network nodes, such as further radio network nodes, e.g. base stations, network nodes, e.g. both radio and core network nodes, etc., as realized by the skilled person, but which are not shown herein for the sake of simplifying.

Figure 2:
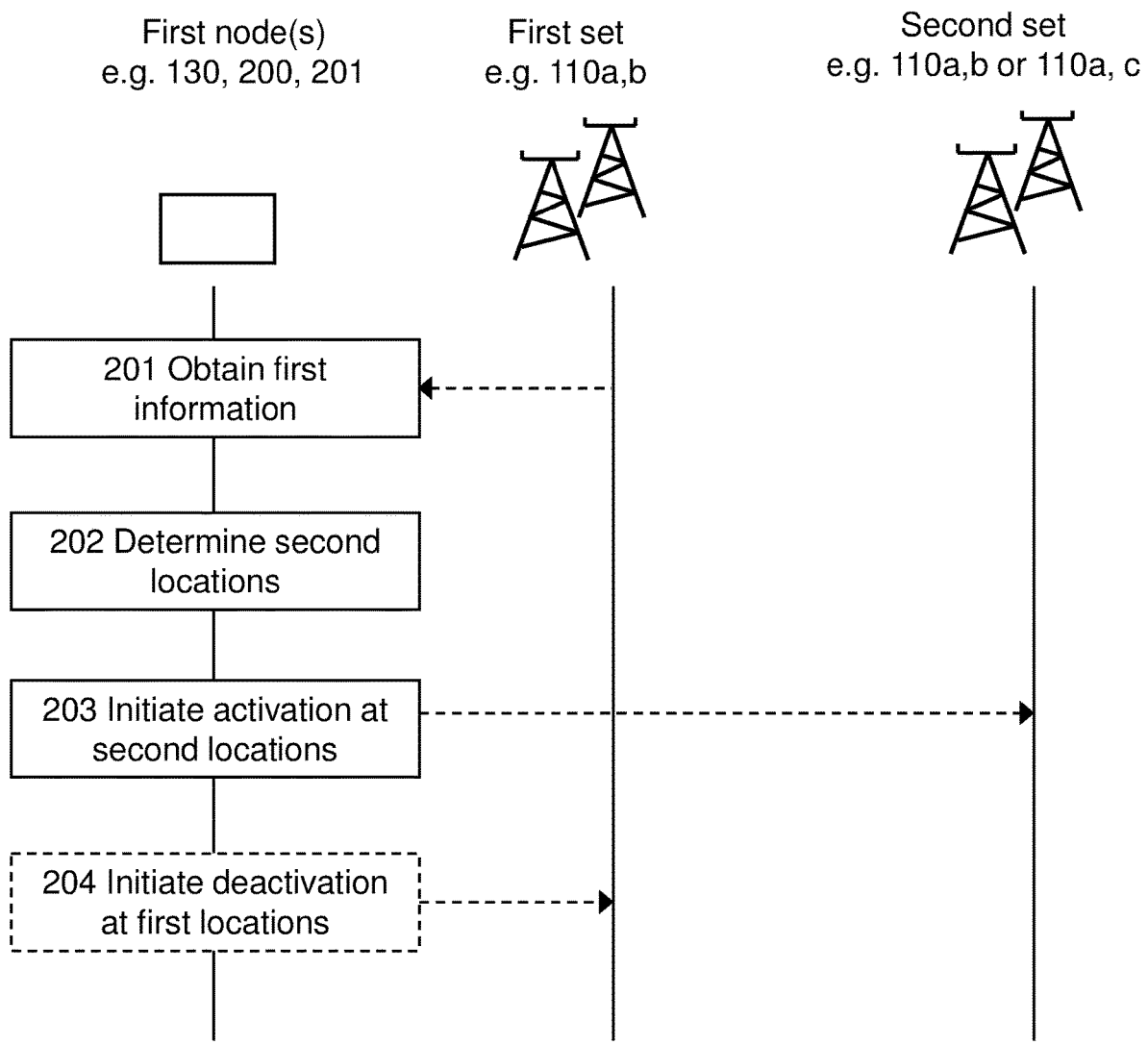
FIG. 2 is a combined signaling diagram and flowchart for describing method and actions according embodiments herein.

FIG. 2 depicts a combined signaling diagram and flowchart, which will be used to discuss embodiments herein.

The actions below, which may form a method, are for providing radio coverage in a wireless communication network, e.g. the wireless communication network 100, for serving wireless communication devices, e.g. the wireless communication devices 120a-c.

The actions are performed by one or more first nodes, e.g. one or more central nodes of the wireless communication network, e.g. control and/or management node(s), e.g. one or more core network nodes, such as the core network node 130, and/or radio network node(s), e.g. one or more of the radio network nodes 110a-c. The one or more first network nodes may alternatively or additionally comprise one or more external nodes, e.g. the further network node 201 and/or the further network 200, i.e. one or more nodes relating to a computer cloud and/or cloud service providing the method as a service to the wireless communication network 100, e.g. via an operator thereof.

In general it may be a preferred implementation to let the actions be carried out by one or more nodes, in practice typically one or more devices or apparatuses communicatively connected to the involved radio network nodes, that are the same for and communicatively connected to all involved radio network nodes, here the radio network nodes 110a-c.

The actions below may be taken in any suitable order and/or be carried out fully or partly overlapping in time when this is possible and suitable.

Action 201

The first node(s) obtain first information relating to current locations of wireless communication devices, e.g. wireless communication devices 120a-c that are currently served by a first set of radio network nodes, e.g. the radio network nodes 110a-b as shown in FIG. 1A, of the wireless communication network 100. The radio network nodes 110a, 110b of the first set are located at first locations 1a, 1b, respectively.

It should be noted that the first information does not have to directly relate to or contain positions corresponding to the current locations of the wireless communication devices. It may suffice that the first information is of a kind that correlates to and/or from which the current locations are derivable, e.g. may be calculated. Some example are given separately below. Locations can e.g. be computed based on geometry and propagation models. If locations are not available Received Signal Strength Indicators (RSSIs) may e.g. be used to estimate a location. If sufficiently accurate time of transmission is known, time of arrival can be used to compute distance from a transmitting wireless device to a receiving radio network node. Often distance and signal attenuation are well correlated.

Action 202

The first node(s) determines, based on the obtained first information, second locations of a second set of radio network nodes, e.g. the radio network nodes 110a, 110b as shown in FIG. 1B, for continued serving of the wireless communication devices 120a-c. The second set are at second locations, e.g. 2a, 2b, differing at least partly from the first locations, e.g. 1a, 1b. The continued serving by the second set of radio network nodes from the second locations are thus for replacing, i.e. instead of, the serving by the first set of radio network nodes from the first locations.

Details and example of how the determination can be accomplished are given in the following and in further detailed examples supported by separate figures discussed below.

In some embodiments the determination is further based on traffic demands of the wireless communication devices, i.e. in the example of wireless communication devices 120a-c. The traffic demands may be derived from or based on a link budget that may provide power at the receiver where e.g. Received Power (dB)=Transmitted Power (dB)+ Gains (dB)−Losses (dB), where the losses can be related to distance through a path loss formula. Further, from estimation of the noise, such as either measured or computed thermal noise, SNR can be provided. This can then be used to compute data rate. In other words, a geometric distance, here from a radio network node to a wireless device that it serves, may relate to a computed and theoretical rate over that link. If there is a traffic demand for a certain data rate this can thus be made to correspond to a distance that can be used in determination of the second locations.

Additionally or alternatively any requested rate from the wireless devices, e.g. any of wireless devices 120a-c, can be used to weight distance. If one wireless device has a low requested rate, and another has a high requested rate, then the a radio network node of the second set should not be positioned in the middle from a geometric perspective, but positioned so that the fraction of requested vs. provided data rate is the same for both wireless communication devices. Other weighting can of course be considered as well.

Moreover, the determination may further based on a number and/or type of radio network nodes available for the second set, where type relates to one of more of the following:
- if the radio network node is mobile and able to relocate to a second location for said continued serving,
- if the radio network node is unable to relocate to a second location for said continued serving, and
- radio coverage capabilities of the radio network node.

In the simplified example illustrated by FIGS. 1A-B, the radio network nodes available for the second set may be radio network nodes 110a-c, but a reason that radio network node 110c would be used in the second set and not radio network node 110b may be that it was found that it would be more suitable to serve wireless communication device from second location 2b but radio network node 110b is stationary and/or not able to relocate to second location 2b, and/or that radio network node 110c is mobile and could (re)locate there, and/or that radio network node 110c has better, or sufficient, radio coverage capabilities for serving wireless communication device 120c from second location 2b compared to radio network node 110b.

As already indicated, the second set may be formed of one or more radio network nodes of the first set, e.g. wireless communication device 110a, and/or additional radio network nodes, e.g. the radio network node 110c not part of the first set.

The determination may further be based on an algorithm for determining the second locations, in the example locations 2a, 2b. As should be understood, the continued serving should be improved in some respect compared to the serving by the first set of radio network nodes. The improved serving may e.g. relate to an improvement of the ability to provide radio coverage for the wireless communication devices 120a-c and/or meeting or fulfilling the traffic demands thereof. The algorithm may be based on computations and/or assumptions in order to find the second locations of the second set of radio network nodes. The algorithm may further be based on computations and/or measurements to determine if serving from the second locations would, or likely would, cause and/or are, causing the improvement. The algorithm may be based on computations and/or simulating behavior based on assumption that the second set of radio network node at the second locations, e.g. radio network nodes 110a-b at 2a-b, would be serving the wireless communication devices 120a-c. Alternatively or additionally the algorithm may be based on measurements and/or computations when the second set of radio network nodes have been activated at said second locations. There being an improvement or not may be determined according to a predefined or predetermined criteria.

The algorithm is advantageously based on forming clusters of the wireless communication devices, e.g. in the simplified example wireless devices 120a-c, by associating the wireless devices with locations, respectively, related to radio network nodes available for the second set. Then determining the second locations using centroids of the formed clusters, respectively. Detailed embodiments and examples of this follow will follow separately below. Such algorithm may be referred to as a clustering algorithm or method.

An alternative way of describing a suitable algorithm, is that the algorithm is based on:

a) Providing initial locations associated with radio network nodes available for the second set. The initial locations may be locations that fully or partly correspond to the first locations and/or new locations that may random in an area where serving of at least some of the wireless communication devices is possible. For example, initial location may be the first locations 1a, 1b, or in case if radio network node 110c is mobile and available, initial locations may be 1a and some other random location (not shown) enabling the wireless communication devices 120a-c to be served.

b) Associating the wireless communication devices, e.g., 120a-c, with the closest locations, respectively, associated with the radio network nodes available for the second set, e.g. radio network nodes 110a-b. To start with the wireless communication devices are thus associated with the closest initial locations, respectively, that in turn are associated with the radio network nodes available for the second set. The initial association may correspond to how wireless devices are currently served, and/or may result in that some wireless devices are associated with other radio network nodes than currently serving them. For example, wireless device 120a may initially be associated with location 1a, and wireless devices 120b-c with location 1b.

c) Computing one or more new locations associated with one or more of the radio network nodes available for the second set, respectively, while keeping the association with the wireless communication devices from b). The computation should be made so that a measure of distance(s), e.g. a measure of a total distance, between these new locations and locations of the wireless communication devices, e.g. 120a-c, is reduced. For example, there may be computed a new location instead of 1a that is closer to the (final) second location 2b if a measure of the distance between the wireless devices 120*b-c* and this new location would be reduced, or even minimized, compared to the previous location, e.g. 1*b*.

The algorithm may further be based on one or more iterations of b) and c), e.g. until there is no or sufficiently little, or reduced, change in new associations in step b), and/or that b) and c) have been performed a predetermined or predefined number of times, and/or until a predetermined or predefined improvement criteria is fulfilled.

Note that the association between the locations in the algorithm and the radio network nodes available for the second set may be accomplished through, i.e. by using, virtual representation. A number of radio network nodes available for the second set may be provided, e.g. determined, each corresponding to a virtual radio network node. The purpose of the algorithm may be to find the second locations and when these have been found, available real radio network nodes may be associated with, or assigned to, the second locations, respectively. The virtual representation of radio network nodes may in detailed example below regarding the algorithm be referred to as centroids although in a strict meaning each virtual representation is not fulfilling a centroid definition vs. associated wireless communication devices all the time, but e.g. at least in step c) where the distance may be reduced, e.g. minimized, by selecting the new placement in a center of the associated wireless devices, e.g. in a centroid thereof. See separate examples below for more information.

Action 203

The first node(s) initiates activation of the second set of radio network nodes, e.g. 110*a*, 110*c*, at said second locations, e.g. 2*a*, 2*b*, to thereby provide radio coverage for said continued serving.

Activation of a radio network node, e.g. base station, at a location may involve to move a mobile radio network node, e.g. base station, already serving wireless communication devices, e.g. at a first location, to the second location and/or switching on the radio network node at the second location. It can also involve activation of some information being transmitted by the radio network node, e.g. so that when this information is transmitted, the radio network node becomes enabled to serve wireless devices.

If the first node(s) comprises the radio network node, the initiation of the activation can be made by the radio network node(s), but in other cases the imitation is typically performed by sending an activation command or instruction, or making such be sent, to the radio network node to be activated for the continued serving, i.e. information that when received by the radio network nodes causes the activation.

Action 204

The first node(s) initiates, based on the determination, deactivation of one or more radio network nodes, e.g. the radio network node 110*b*, of the first set at the first location(s), e.g. at 1*b*.

Deactivation of a radio network node at a first location may involve stopping the radio network nodes from serving wireless devices at that location, e.g. by switching off radio coverage and/or moving the radio network node to a new location, e.g. a second location. In the example, the radio network node 110*b* may be deactivated at location 1*b* by being moved to location 3*b* and/or be switched off at location 1*b* and/or that certain information that enable serving of wireless communication devices is no longer transmitted by the radio network node 110*b*.

Deactivation may e.g. be relevant in the case of UDN radio network node and/or when a serving mobile radio network node is to be moved to a new location for continued serving.

As should be realized from the above, the first and second set of radio network nodes may relate to each other in different ways in different situations and scenarios.

The second set may e.g. relate to one or more radio network nodes that were not part of the first set. This may e.g. be the case if the radio network nodes are part of a UDN and/or in the case of added mobile radio network for the second set.

Moreover, the second set may additionally or alternatively relate to one or more radio network nodes that are the same as in the first set. This may e.g. be the case when conventional fix location, i.e. stationary, radio network nodes are involved, or one or more UDN radio network node of the first set that should remain active at the same location. Further, the second set may relate to one or more radio network nodes that are the same in the first set and the second set and that are to be moved from their first locations in the first set to other, second locations in the second set.

Furthermore, the first and second set of radio network nodes may comprise radio network nodes belonging to fixed locations and activation at the second locations may relate to activation of one more radio network nodes at such fixed, second, locations that differ from the first locations. This is typically the case when the first and second sets involve a UDN of radio network nodes and may be combined with deactivation of one or more radio network nodes of the first set at fixed, first locations.

Figure 3A:
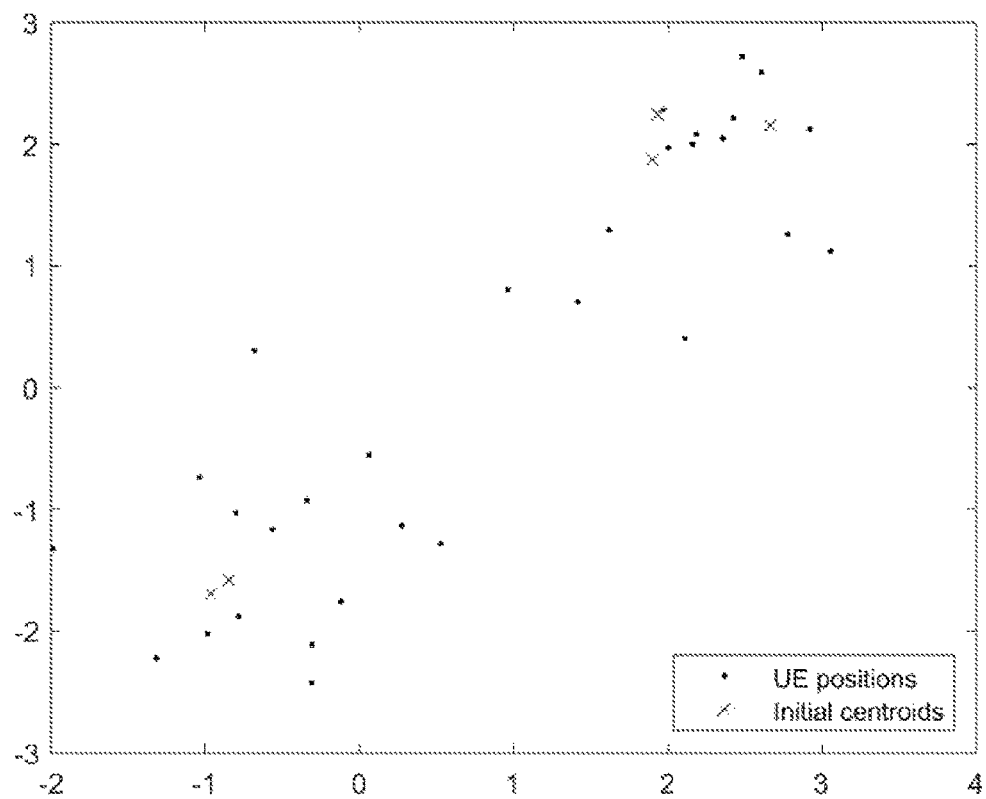
FIG. 3A is a diagram schematically illustrating a first example with locations of wireless communication devices and initial, first locations related to radio network nodes, that may be mobile, for serving the wireless communication devices.

FIG. 3A is a diagram schematically illustrating a first example with locations of wireless communication devices and initial locations, referred to as initial centroids in the figure, relating to a first set of radio network nodes, named BS in the figure, currently serving the wireless communication devices. The initial locations or centroids of the figure thus correspond to the radio network nodes at first locations, respectively, as discussed above. The locations of wireless communication devices, named UE positions in the figure, correspond to locations where the wireless communication devices are positioned, respectively.

Figure 3B:
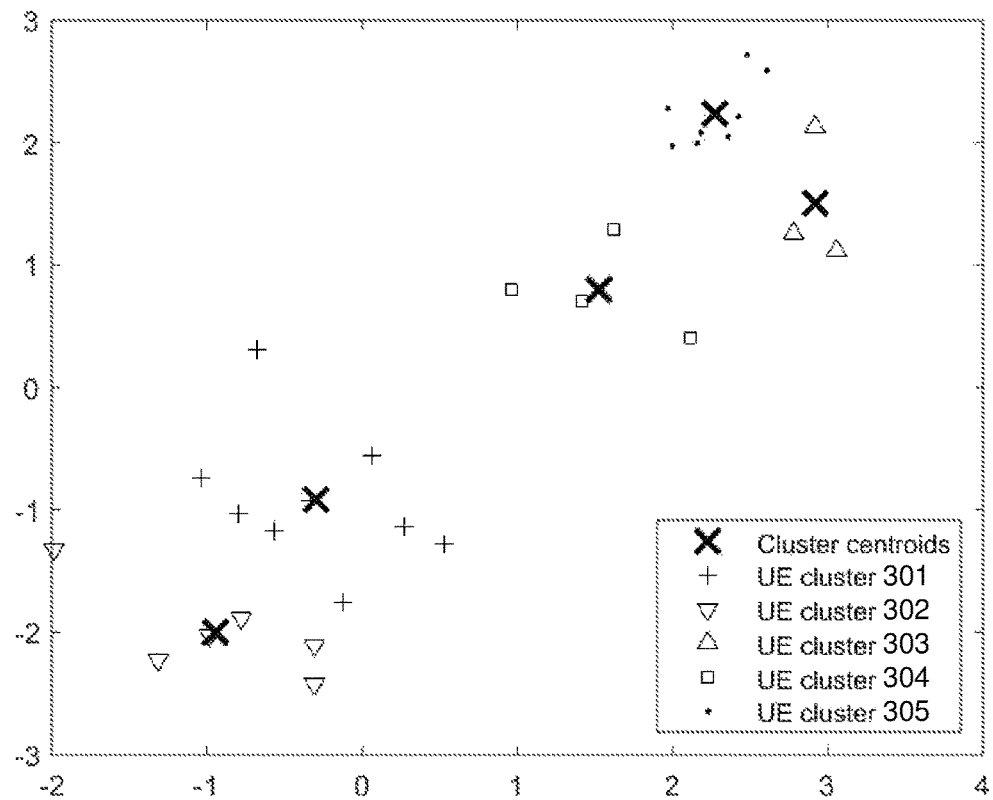
FIG. 3B is a diagram schematically illustrating the first example where application of embodiments herein has resulted in new, second locations related to the radio network node and to where the radio network nodes, if mobile, may move for continued serving of the wireless communication devices.

FIG. 3B is a diagram schematically illustrating the first example where application of embodiments herein has resulted in new, second locations related to a second set of radio network nodes that may, or may not, fully or partly be the same radio network nodes as in the first set. As can be seen the wireless communication devices are shown at the same locations as in FIG. 3A, where they may be assumed to remain although there in practice may have occurred changes in the positions at the point in time when the second locations have been determined and/or when the second set of radio network nodes are activated at the second locations.

The wireless communication devices are grouped into 5 clusters 301-305, that may be the result after application of such algorithm as indicated above and described further below. Each cluster is associated with a radio network node at a second location. There are in total 5 radio network nodes at second locations, respectively, one per cluster, for continued serving of the wireless communication devices. These radio network nodes thus constitute a second set of radio network nodes, as described above.

The locations are in FIGS. 3A-B shown in an area with a local x-y coordinate system without units this is not relevant for illustrating the principle underlying embodiments herein. The same goes for FIGS. 4a-b.

Figure 4A:
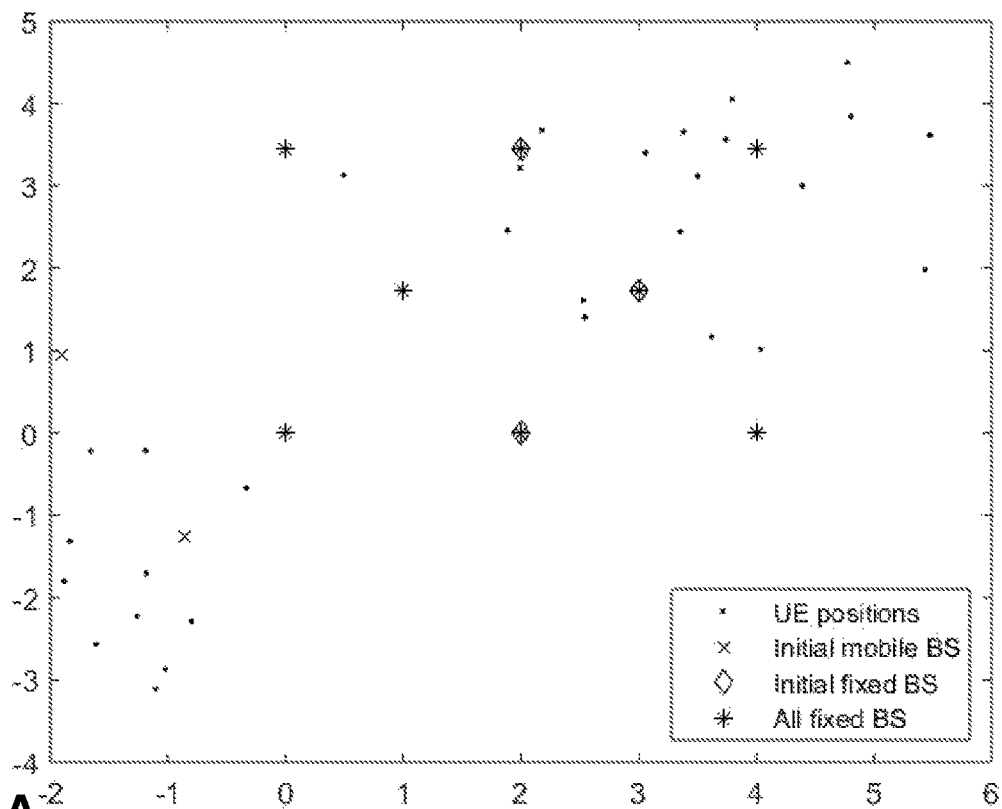
FIG. 4A is a diagram schematically illustrating a second example with locations of wireless communication devices and initial, first, locations related to radio network nodes, that are a mix of mobile and fix position nodes, for serving the wireless communication devices.

FIG. 4A is a diagram schematically illustrating a second example with locations of wireless communication devices and initial, i.e. first, locations related to radio network nodes, named BS in the figure, that are a mix of mobile and fix position nodes, for serving the wireless communication devices. As in FIG. 3A, the locations of wireless communication devices, named UE positions, correspond to locations where the wireless communication devices are located, respectively. There are 3 different types of a total of 9 radio network nodes indicated in the figure. There are two mobile radio network node and 3 fix position, i.e. stationary, radio network nodes at their initial, i.e. first, positions serving the wireless communication devices. There are further 5 fix position, i.e. stationary, radio network nodes that are initially not involved in serving the wireless communication devices. These radio network nodes may e.g. be in an deactivated state and may e.g. be part of a UDN, which may be the same UDN as the other 3 fix position radio network nodes may be part of.

Figure 4B:
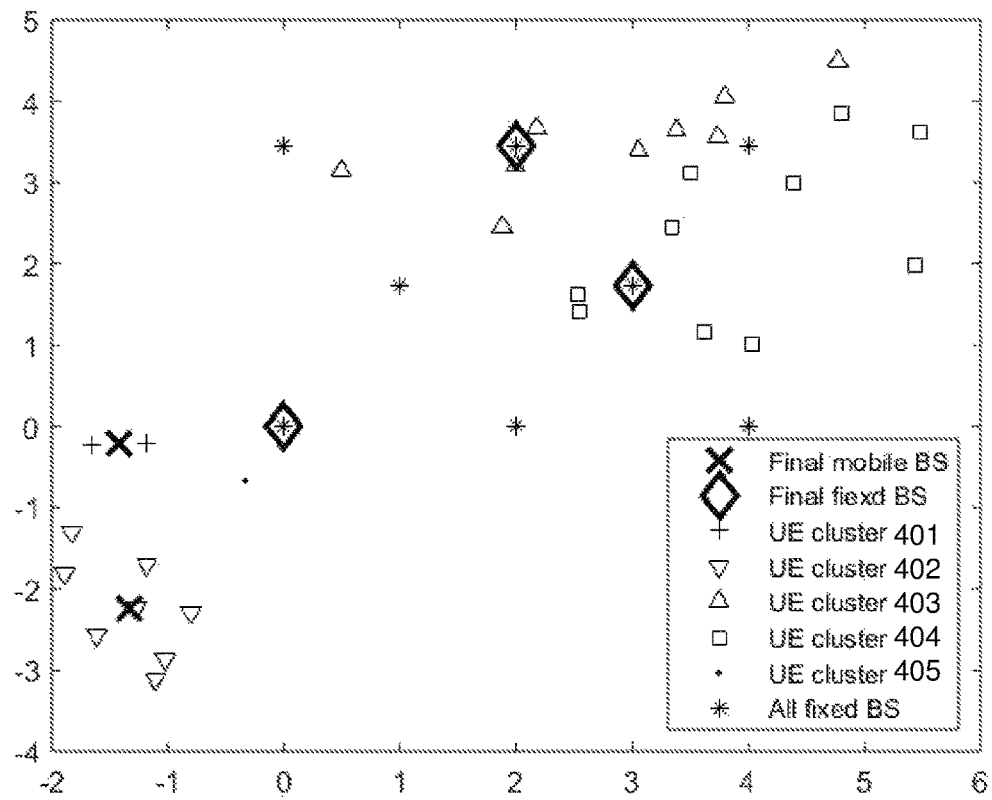
FIG. 4B is a diagram schematically illustrating the second example where application of embodiments herein has resulted in new, second locations related to radio network nodes for continued serving of the wireless communication devices.

FIG. 4B is a diagram schematically illustrating the second example where application of embodiments herein has resulted in new, final, or second, locations related to radio network nodes, named BS in the figure, for continued serving of the wireless communication devices. The wireless communication devices are grouped into 5 clusters 401-405, that may be the result after application of such algorithm as indicated above and described further below. Each cluster is associated with a radio network node at a second location. There are in total 5 radio network nodes at second locations, respectively, one per cluster, for continued serving of the wireless communication devices. These radio network nodes thus constitute a second set of radio network nodes, as described above, and involve 2 mobile radio network nodes and 3 fix location, i.e. stationary, radio network nodes.

As can be seen, two of the fix location radio network nodes of the second set are the same as of the first set and thus radio network nodes that continue to serve from the same location in both sets, more particularly are these for continued serving of clusters 403 and 404 of wireless communication devices. The third fix location radio network node of the second set is a fix position radio network node that was not part of the first set and may have been in a deactivated state, but is now to be activated as part of the second set for continued serving of cluster 405 of wireless communication device(s). The two mobile radio network nodes of the second set are at second locations that are different from any of the first locations, which is typically the case when mobile radio network nodes are involved. These mobile radio network nodes may be the same as the mobile radio network node of the first set (in FIG. 4A) that in such case is to be moved and relocated to its second location as part of the second set, but this is not necessary, it could as well be that both mobile radio nodes of the second set were not involved in the first set at all and are moved in from outside the area to their respective second location. The two mobile radio network nodes of the second set are for continued serving of clusters 401 and 402 of wireless communication devices.

As indicated above, embodiments herein may employ mobile radio network nodes, such as base stations, that are positioned, preferably by themselves by being part of a vehicle, in optimal or at least likely or potentially improved places according to the second locations. This enable flexible cell shaping based on traffic demand and can be made based on clustering UEs, i.e. wireless communication devices, in a given area. A model order, e.g. for a clustering algorithm to be used, corresponding to the number of radio network nodes available for the continued serving can be based on a number of available mobile radio network nodes operating in and/or available for that area. It can also be based on the number of wireless communication devices to be served and the traffic load caused by or expected to be caused by these. The model order thus corresponds to the number of clusters. The number of clusters can be input to the clustering algorithm that in response may return, i.e. output, locations of centroids of all five clusters as well as which wireless communication device that belongs to which cluster. In this example, the centroids thus indicate where to activate the radio network nodes for continued serving, including e.g. where to move and position mobile radio network node(s).

In the case of a UDN, a parameter K may indicate a number of radio network nodes, such as base stations, for the second set, e.g. to be activated and used for continued serving of the wireless communication devices. For UDNs the maximum value of K may typically be larger than in a case with only mobile base stations. However, to conserve energy and limit interference, the value of K should not be higher than necessary, e.g. if increasing K, i.e. adding another radio network node for the second set, would only provide marginal improvements, it may be better to refrain from increasing K further.

Moreover, in case of mobile radio network nodes it may be possible to place the radio network nodes more or less optimal, e.g. spot on a location that may correspond to a cluster centroid output from the clustering algorithm. However, in the case of UDNs, or stationary radio network nods in general, the second locations where radio network nodes actually can be activated are affected by their available actual locations. A stationary radio network node e.g. part of a UDN that is located as close as possible to an optimal position, e.g. as output from the algorithm, may be selected as part of the second set for continued serving. Another option may be to make the clustering algorithm to select the best second locations for K radio network nodes from a given set of available radio network nodes at fix locations.

As already indicated above, there may in practice be a mix of mobile and stationary radio network nodes involved in embodiments herein. In such case, K may denote a total number of radio base stations for the second set, M may be a number of mobile radio network nodes for the second set (M<=K), and N be a number of fix, i.e. stationary, radio network nodes for the second set (N<=K, N+M=K), e.g. part of a UDN. The stationary radio network nodes may in turn be selected from a larger set of a total of T available stationary radio network nodes in a particular area, e.g. at their known fix locations. T may thus be substantially larger than K and N.

Figure 5:
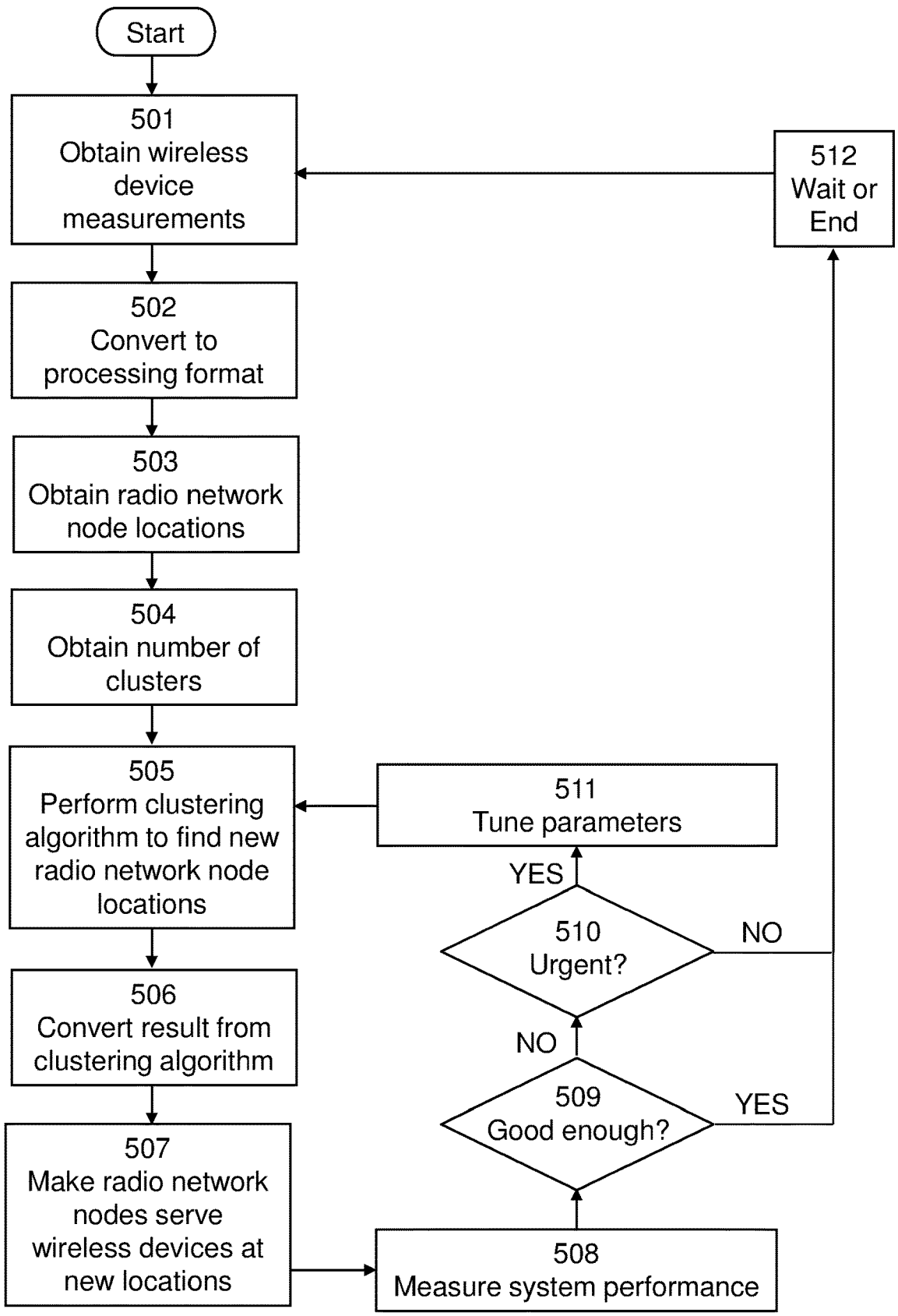
FIG. 5 is a flowchart schematically illustrating actions related to embodiments herein.

FIG. 5 is a flowchart schematically illustrating actions related to embodiments herein.

Action 501

Radio network nodes in an area gather, i.e. obtain, information including e.g. measurements from wireless communication devices that the radio network nodes serve in the area. The information may comprise GPS-coordinates, traffic needs, etc. A current trend is that wireless communication devices become more capable and can include many different sensors. In future wireless communication networks there may be even more data than today that can be obtained from wireless communication devices being served in a wireless communication network. Sensor measurements and data can be of great value and contain useful information and will likely be used to improve performance in such future systems. It may be noted that this action assumes that the wireless communication devices are already connected to and is served by a radio network node. Any initial access procedure is not included. Such can be carried out in a conventional manner and/or as normal in the wireless communication network. The involved radio network nodes in the area may communicate, e.g. send, the obtained information to some central processing device or unit, for example in a cloud, that collects such information for all involved radio network nodes.

This action may fully or partly correspond to Action 201 discussed above.

Action 502

The information including e.g. data from measurements gathered in Action 501 may be converted to a useful processing format, e.g. for the algorithm to be used. For instance, if there is a clustering algorithm to be used that operates on locations of wireless communication devices, then all kind of information that can provide position information may have been gathered and be used, e.g., GPS positions, barometric pressure to get elevation (particularly for indoor users), timing measurements from stationary radio network nodes (also possible for mobile radio network nodes if their instantaneous position is known) for triangulation etc. If the clustering algorithm considers position and traffic load, the expected traffic load from each wireless communication device can either be estimated at the radio network node serving it and/or be signaled from the wireless communication device.

Note that in the present disclosure, position of wireless communication devices is mainly used for clustering, but this should not be considered as the only possible metric that can be used for clustering. As indicated above it is also possible to weight positions etc. The information after conversion to suitable processing format, if needed, may then be added to a data set, and/or input, to the algorithm.

This action may also fully or partly correspond to Action 201 discussed above.

Action 503

Information may also be obtained on locations of one or more of the radio network nodes currently serving the wireless communication devices, corresponding to the first locations of the first set of radio network nodes mentioned above. It may additionally or alternatively be obtained information also on locations of radio network nodes available for continued serving.

These positions may form starting point for the algorithm. Alternatively or additionally starting positions of one or more of the radio network nodes may be randomized in the area or selected in another way.

This action may also fully or partly correspond to Action 201 discussed above.

Action 504

A model order may be selected and may correspond to the number of radio base stations of the second set for the continued serving and/or the number of clusters to form, as already mentioned above. The model order may be based on the number of wireless communication devices and their associated traffic demands and/or load. In the clustering context this thus corresponds to the total number of clusters to be formed and the number of radio network nodes of the second set. When centroids of the clusters are used for finding locations for the radio network nodes of the second set, there will thus be as many centroids as clusters. The model order may correspond to K mentioned above. The model order or K should never exceed the total number of base stations available in the area but can be selected lower if this is believed or found sufficient for the continued serving of the wireless communication devices. This model order can be static between different occasions the algorithm is being executed if e.g. the number of and/or distribution of wireless communication devices is comparably static and if only position is used for clustering. The model order can be updated, i.e., the K parameter reselected, between different occasions the algorithm is executed, if e.g. the position distribution of wireless communication device changes substantially. If the traffic demand and/or load is also considered, the K parameter can be updated if e.g. the traffic demand and/or load changes substantially. With a lower traffic demand and/or load it can be sufficient with a smaller K, with a higher traffic dean and/or load, a higher K may be used if possible, etc.

This action may fully or partly correspond to Action 202 discussed above.

Action 505

The algorithm, preferably a clustering algorithm, is executed and may as input use the information and model order from previous actions. The algorithm should return information on second locations for radio base stations for continued serving of the wireless communication devices and may also return information, e.g. an index, information about which cluster each wireless communication device belongs to. Different algorithms can be used in this action, see FIG. 6 and related text below for some further details. In principle any clustering algorithm can be used. When a clustering algorithm is described it may refer to that cluster centroids are moved and there are changes by assignment/reassignment to the clusters. The centroids may correspond to radio network nodes and the assignment/reassignment to wireless communication devices. Note that moving the centroids does not have to correspond to any physical movement or assignment/reassignment of radio network nodes during execution of the algorithm. It may instead advantageously take place virtually to avoid unnecessary movements of the physical radio network nodes during execution of the algorithm. This corresponds to the virtual representation of radio network nodes mentioned above for finding the second locations.

This action may fully or partly correspond to Action 202 discussed above.

Action 506

The processing format and/or output format, may if needed be converted to a relevant form, e.g. to enable of facilitate practical use of output from the algorithm. The conversion may be an inverse of the conversion under Action 502. If e.g. the algorithm operates directly on position information, conversion may not be needed.

This action may fully or partly correspond to Action 202 discussed above.

Action 507

Here the output from the algorithm is used to make radio network nodes serve the wireless communication devices from (new) locations based on the output from the algorithm, i.e. there is provided continued serving of the wireless communication devices from these locations. The locations here thus correspond to the second locations mentioned above and the radio network nodes here thus correspond to the second set.

Mobile radio network nodes may in this action thus be made to relocate to a new position, e.g. to a location corresponding to a centroid of a cluster of the wireless communication devices. If all K radio network nodes are mobile (i.e. M=K) all may relocate to positions that may correspond to more or less the exact locations, e.g. centroid locations, according to the output of the algorithm. If some of the K active base stations are stationary (N>0), then there is a possibility to here change which N of the total T available stationary base stations that are to be used.

If a wireless communication device is served by a radio network nodes that will be deactivated since it is not part of the radio network noes for the continued serving, i.e. part of the first set but not of the second set, then there will be a handover. Handover can also occur due to that a mobile radio network node serving a wireless device from a first location is moved to a second location whereby the wireless communication devices is better served by and handed over to another radio base station of the second set.

This action may fully or partly correspond to Actions 203-204 discussed above.

Actions 508-512

In Action 508 it may be checked performance of the overall network in the area of concern and relating to serving of the wireless communication devices following the continued serving from new locations resulting from action 506. Many different performance measures can be used for this, as recognized by the skilled person. Examples of system performance parameters include average user throughput, throughput of 5% percentile or similar.

If the system performance checked under Action 507 according to some predetermined or predefined criteria is considered good enough, see Action 509. Action 501 etc. may then be repeated, possibly after a certain period, see Action 512, to avoid too frequent handovers and making serving radio network nodes change location too often, such as mobile ones moving around hysterically. For example, it may through Action 512 or similar be made sure that Action 501, or at least Action 507, is not performed more than once every 1-5 minutes, although exact time may be set and depend on system parameters in each practical case and situation.

However, if the performance checked under action 509 is not considered good enough, parameters of, such as input to, the algorithm in Action 505 may be tuned, see Action 511. For example by adding more radio network nodes if possible, or in other words by increasing the model order and number of clusters. Adding more radio network nodes may include adding mobile and/or stationary radio network nodes. It may also be assessed whether the system is over-provisioning, i.e., the abovementioned system parameters are too good in comparison to e.g. promised performance and/or some other predefined and/or predetermined criteria. If so, the number of radio network nodes as input to the algorithm can instead be reduced.

If it is considered urgent, see e.g. Action 510, such as if user data rates have drastically dropped, e.g. according to the performance check in Action 509, or any kind of indication that the use-experience has deteriorated in response to Action 507, Action 505 and e.g. re-clustering should be performed as soon as possible. Otherwise Action 501 may be performed and possibly after some waiting in Action 512. For example, if traffic load increases rapidly following Action 507, Action 505 and the algorithm with tuned parameters should be executed again directly to minimize the time period of low use-rates. On the other hand, it the system offers too high rates, system utilization is low, it is not the same hurry to reduce the number of radio network nodes and perform Action 505 again. To generalize, if further radio network nodes should be added to minimize time of bad user experience, the algorithm in action 505 and e.g. (re)clustering should be executed again as soon as possible, without any waiting, but is the system performance is "too good" it is typically not the same rush to reduce serving capacity by decreasing the number of radio network nodes.

Figure 6:
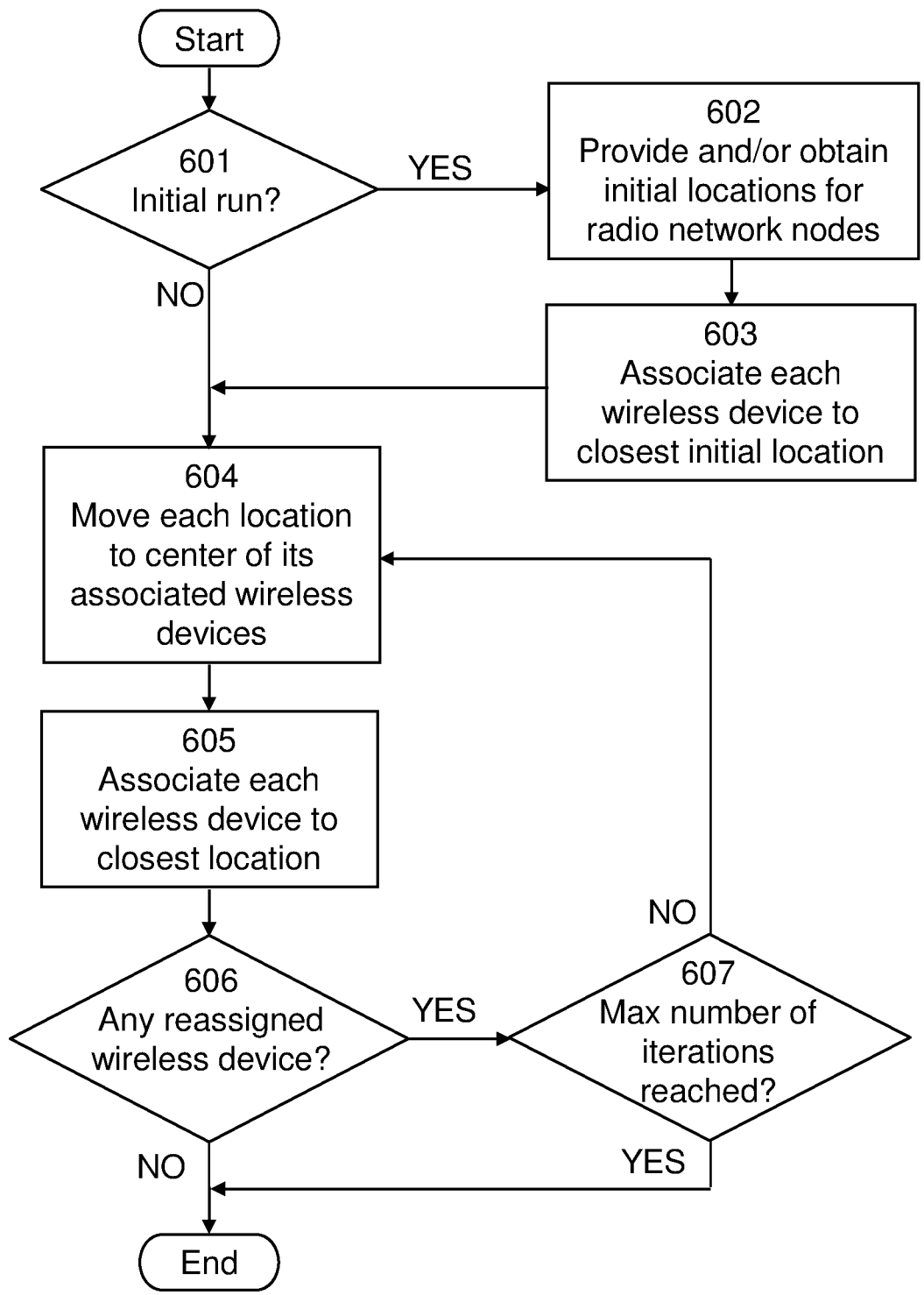
FIG. 6 is a flowchart schematically illustrating actions of an algorithm related to embodiments herein.

FIG. 6 is a flowchart schematically illustrating actions of an algorithm related to embodiments herein, in particular an algorithm, e.g. clustering algorithm, that may be used in e.g. Action 202 and Action 505 described above. In other words, the algorithm is for finding new or second locations to be used by radio network noes for continued serving of wireless communication devices in an area, and which wireless communication devices are already served in the area by radio network nodes at first locations.

Action 601

The algorithm is iterative as already indicated above and it may therefore first be checked if it is an initial run, i.e. first iteration, or not.

Action 602

If the check in Action 601 results in that is the first iteration, it may be provided and/or obtained initial, or starting locations for radio network nodes, i.e. starting locations to be used in the algorithm. The initial locations may be locations of one or more of the first locations of the radio network nodes currently serving and/or may be locations randomized in the area or placed here according to some predefined or predetermined criteria, e.g. based on current position of a mobile radio network node that is to be used for the continued serving but that is not currently serving. The model order, i.e. number of available radio network nodes that the algorithm shall position, and possibly also their type and current location may also be used as input for this action.

Action 603

Each wireless device may be associated with their closest, e.g. nearest, initial location of a radio network node, with or without weighting involved as mentioned above. Note that during execution of the algorithm there may be virtual representation of the involved radio network nodes, as already mentioned in the foregoing, and no need to actually physically move or change anything regarding real radio network nodes. The wireless communication devices that are associated with the same (initial) location belong to the same initial cluster.

Action 604

Each location of (e.g. virtually represented) radio network nodes is moved so as to reduce a measure of distance and/or cost for the radio network node to serve its associated wireless communication devices. This may be include to find a new location that reduces a measure of a distance that the radio network node has relative to its associated wireless communication devices i.e. vs. its cluster of associated wireless communication devices. This may e.g. include to change location to a center of its associated wireless devices, i.e. its associated cluster, for example to a centroid thereof.

Action 605

When locations have changed according to action 604 it is again performed association corresponding to Action 603 but now in relation to the new locations from Action 604. This may cause change so that some wireless devices change cluster they belong to and thus cause change in which wireless devices that are associated with which location of (e.g. virtually represented) radio network node.

Action 606

It may be checked if Action 605 resulted in any substantial re-assignment, e.g. if any wireless device that have changed which location of (virtually represented) radio network node it is associated with, i.e. change in which cluster the wireless communication devices belongs to.

Action 607

It may also be checked if a max number of iterations has been reached. This number that may be predefined or predetermined thus set a limit to the number of iterations that may be performed and may be used to make sure that the algorithm will not stuck in loop that is too long.

If there has been a change according to Action 606 and the iteration limit according to Action 606 has not been reached, Actions 604-605 may be performed again etc.

If not, the algorithm may end and may output the locations to be used by the radio network nodes for continued serving of the wireless communication devices. As mentioned above the algorithm may also as output indicate which wireless communication device that should be served by which radio network node, and thus indicate which clusters the wireless communication devices belong to, respectively.

Actions 603-606 above may be performed based on different known general clustering algorithms, e.g. a so called K-means clustering algorithm or a so called Expectation Maximization (EM) clustering algorithm.

If there are only mobile radio network nodes involved, then embodiments herein may involve locating the mobile radio network nodes at cluster centroids, where the clusters are clusters formed of the wireless communication devices. If there are only stationary radio network nodes involved, e.g. part of a UDN, then embodiment herein may relate to finding a subset of available radio network nodes for the second set so that the radio network nodes of the second set are as close to cluster centroid locations as possible.

If there is a mix of fixed and mobile radio network nodes, embodiments herein may involve selecting a subset of stationary radio network nodes to be as close as possible to cluster centroid locations, and then move the mobile radio network nodes so they are located at cluster centroid locations.

Figure 7:
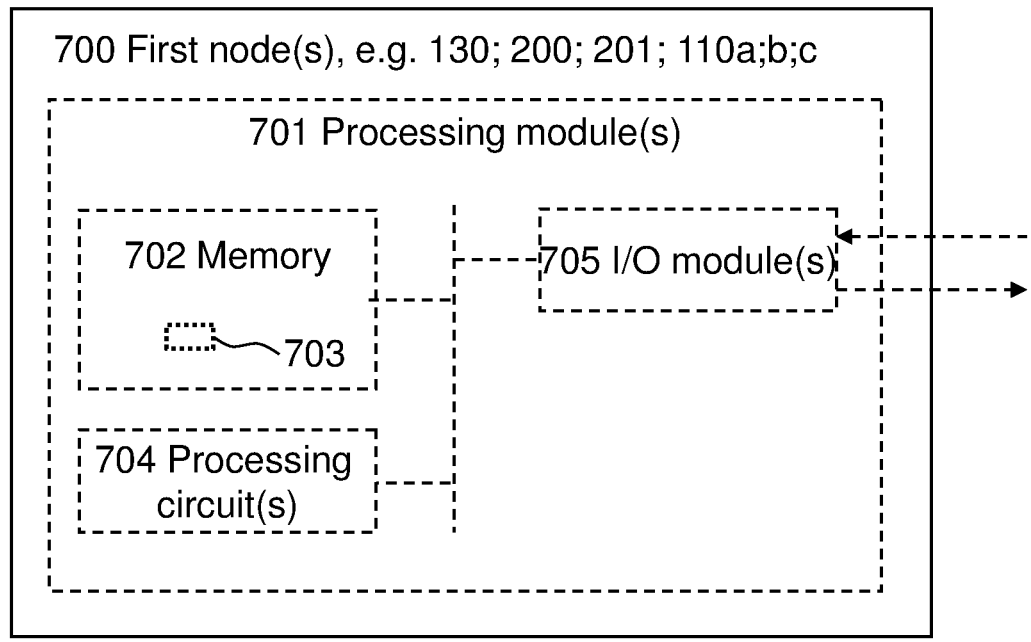
FIG. 7 is a functional block diagram for illustrating embodiments of first node(s) according to embodiments herein and how can be configured to carry out the method and actions described in relation to FIG. 2.

FIG. 7 is a schematic block diagram for illustrating embodiments of one or more first nodes 700. The schematic block diagram is also used for illustrating embodiments of how the first node(s) 700, in this case corresponding to the first node(s) mentioned above in connection with FIG. 2, may be configured to perform the method and actions thereof.

Hence, the first node(s) 700 is for providing radio coverage in the wireless communication network 100 for serving wireless communication devices, exemplified by wireless communication devices 120*a-c*.

The first node(s) 700 may comprise processing module(s) 701, such as a means, one or more hardware modules, including e.g. one or more processors, and/or one or more software modules for performing said method and/or actions.

The first node(s) 700 may further comprise memory 702 that may comprise, such as contain or store, a computer program 703. The computer program 703 comprises 'instructions' or 'code' directly or indirectly executable by the first node(s) 700 to perform said method and/or actions. The memory 702 may comprise one or more memory units and may further be arranged to store data, such as configurations and/or applications involved in or for performing functions and actions of embodiments herein.

Moreover, the first node(s) 700 may comprise processing circuit(s) 704 as exemplifying hardware module(s) and may comprise or correspond to one or more processors. In some embodiments, the processing module(s) 701 may comprise, e.g. 'be embodied in the form of' or 'realized by' the processing circuit(s) 704. In these embodiments, the memory 702 may comprise the computer program 703 executable by the processing circuit(s) 704, whereby the first node(s) 700 is operative, or configured, to perform said method and/or actions thereof.

Typically the first node(s) 700, e.g. the processing module(s) 1001, comprises Input/Output (I/O) module(s) 705, configured to be involved in, e.g. by performing, any communication to and/or from other units and/or nodes, such as sending and/or receiving information to and/or from other nodes or devices. The I/O module(s) 705 may be exemplified by obtaining, e.g. receiving, module(s) and/or providing, e.g. sending, module(s), when applicable.

Further, in some embodiments, the first node(s) 700, e.g. the processing module(s) 701, comprises one or more of obtaining module(s), determining module(s), and initiating module(s), as exemplifying hardware and/or software module(s). These modules may be fully or partly implemented by the processing circuit(s) 704.

The first node(s) 700, and/or the processing module(s) 701, and/or the processing circuit(s) 704, and/or the I/O module(s) 705, and/or the obtaining module(s) may be operative, or configured, to obtain said first information.

Further, the first node(s) 700, and/or the processing module(s) 701, and/or the processing circuit(s) 704, and/or the determining module may be operative, or configured, to determine, based on the obtained first information, said second locations.

Moreover, the first node(s) 700, and/or the processing module(s) 701, and/or the processing circuit(s) 704, and/or the I/O module 705, and/or the initiating module may be operative, or configured, to initiate said activation of the second set of radio network nodes at said second locations.

Also, the first node(s) 700, and/or the processing module(s) 701, and/or the processing circuit(s) 704, and/or the I/O module 705, and/or the initiating module may be operative, or configured, to initiate, based on the determination, said deactivation of the one or more radio network nodes of the first set at the first locations.

Figure 8:
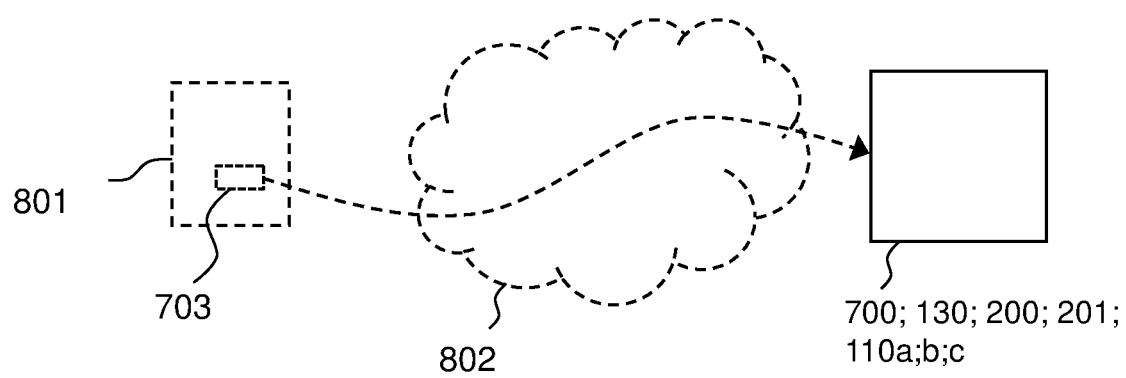
FIG. 8 is a schematic drawing illustrating embodiments relating to a computer program, and carriers thereof, to cause the first node(s) to perform the method and actions described in relation to FIG. 2.

FIG. 8 is a schematic drawing illustrating some embodiments relating to computer program and carriers thereof to cause said first node(s) 700 discussed above to perform the method and actions. The computer program may be the computer program 703 and comprises instructions that when executed by the processing circuit(s) 704 and/or the processing module(s) 701, causes the first node(s) 700 to perform as described above. In some embodiments there is provided a carrier, or more specifically a data carrier, e.g. a computer program product, comprising the computer program. The carrier may be one of an electronic signal, an optical signal, a radio signal, and a computer readable storage medium, e.g. a computer readable storage medium 801 as schematically illustrated in the figure. The computer program 703 may thus be stored on the computer readable storage medium 801. By carrier may be excluded a transitory, propagating signal and the data carrier may correspondingly be named non-transitory data carrier. Non-limiting examples of the data carrier being a computer readable storage medium is a memory card or a memory stick, a disc storage medium such as a CD or DVD, or a mass storage device that typically is based on hard drive(s) or Solid State Drive(s) (SSD). The computer readable storage medium 801 may be used for storing data accessible over a computer network 802, e.g. the Internet or a Local Area Network (LAN). The computer program 703 may furthermore be provided as pure computer program(s) or comprised in a file or files. The file or files may be stored on the computer readable storage medium 801 and e.g. available through download e.g. over the computer network 802 as indicated in the figure, e.g. via a server. The server may e.g. be a web or File Transfer Protocol (FTP) server. The file or files may e.g. be executable files for direct or indirect download to and execution on said first node to make it perform as described above, e.g. by execution by the processing circuit(s) 704. The file or files may also or alternatively be for intermediate download and compilation involving the same or another processor to make them executable before further download and execution causing said first node(s) 700 to perform as described above.

Note that any processing module(s) and circuit(s) mentioned in the foregoing may be implemented as a software and/or hardware module, e.g. in existing hardware and/or as an Application Specific Integrated Circuit (ASIC), a field-programmable gate array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analogue and digital circuits, and/or one or more processors configured with software and/or firmware, e.g. stored in memory, that, when executed by the one or more processors may make the node(s) and device(s) to be configured to and/or to perform the above-described methods and actions.

Identification by any identifier herein may be implicit or explicit. The identification may be unique in a certain context, e.g. in the wireless communication network or at least in a relevant part or area thereof.

The term "network node" or simply "node" as used herein may as such refer to any type of node. e.g. in the form of a device, that may communicate with another node in and be comprised in a communication network, e.g. Internet Protocol (IP) network and/or wireless communication network. Further, such node may be or be comprised in a radio network node (e.g. as described below) or any network node, which e.g. may communicate with a radio network node. Examples of such network nodes include any radio network node, a core network node, Operations & Maintenance (O&M), Operations Support Systems (OSS), Self Organizing Network (SON) node, etc.

The term "radio network node" as may be used herein may as such refer to any type of network node for serving a wireless communication device, e.g. a so called User Equipment or UE, and/or that are connected to other network node(s) or network element(s) or any radio node from which a wireless communication device receives signals from. Examples of radio network nodes are Node B, Base Station (BS), Multi-Standard Radio (MSR) node such as MSR BS, eNB, eNodeB, gNB, network controller, RNC, Base Station Controller (BSC), relay, donor node controlling relay, Base Transceiver Station (BTS), Access Point (AP), New Radio (NR) node, transmission point, transmission node, node in distributed antenna system (DAS) etc.

Each of the terms "wireless communication device", "user equipment" and "UE", as may be used herein, may as such refer to any type of wireless device arranged to communicate with a radio network node in a wireless, cellular and/or mobile communication system, and may thus be referred to as a wireless communication device. Examples include: target devices, device to device UE, device for Machine Type of Communication (MTC), machine type UE or UE capable of machine to machine (M2M) communication, Personal Digital Assistant (PDA), iPAD, Tablet, mobile, terminals, smart phone, Laptop Embedded Equipment (LEE), Laptop Mounted Equipment (LME), Universal Serial Bus (USB) dongles etc.

While some terms are used frequently herein for convenience, or in the context of examples involving other a certain, e.g. 3GPP or other standard related, nomenclature, it must be appreciated that such term as such is non-limiting Also note that although terminology used herein may be particularly associated with and/or exemplified by certain communication systems or networks, this should as such not be seen as limiting the scope of the embodiments herein to only such certain systems or networks etc.

As used herein, the term "memory" may refer to a data memory for storing digital information, typically a hard disk, a magnetic storage, medium, a portable computer diskette or disc, flash memory, Random Access Memory (RAM) or the like. Furthermore, the memory may be an internal register memory of a processor.

Also note that any enumerating terminology such as first node, second node, first base station, second base station, etc., should as such be considered non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number" or "value" may refer to any kind of digit, such as binary, real, imaginary or rational number or the like. Moreover, "number" or "value" may be one or more characters, such as a letter or a string of letters. Also, "number" or "value" may be represented by a bit string.

As used herein, the expression "may" and "in some embodiments" has typically been used to indicate that the features described may be combined with any other embodiment disclosed herein.

In the drawings, features that may be present in only some embodiments are typically drawn using dotted or dashed lines.

As used herein, the expression "transmit" and "send" are typically interchangeable. These expressions may include transmission by broadcasting, uni-casting, group-casting and the like. In this context, a transmission by broadcasting may be received and decoded by any authorized device within range. In case of unicasting, one specifically addressed device may receive and encode the transmission. In case of group-casting, e.g. multicasting, a group of specifically addressed devices may receive and decode the transmission.

When using the word "comprise" or "comprising" it shall be interpreted as nonlimiting, i.e. meaning "consist at least of".

The embodiments herein are not limited to the above described embodiments. Various alternatives, modifications and equivalents may be used. Therefore, the above embodiments should not be taken as limiting the scope of the present disclosure, which is defined by the appending claims.

The invention claimed is:

1. A method, performed by one or more first nodes, for providing radio coverage in a wireless communication network for serving wireless communication devices, the method comprising:
obtaining first information relating to current locations of the wireless communication devices that are currently served by a first set of radio network nodes of the wireless communication network, which radio network nodes of the first set are located at first locations, respectively;
determining, based on the obtained first information, second locations of a second set of radio network nodes for continued serving of the wireless communication devices instead of by the first set at the first locations, the second locations differing at least partly from the first locations; and
initiating activation of the second set of radio network nodes at said second locations, to thereby provide radio coverage for the continued serving.

2. The method as claimed in claim 1, wherein the determination is further based on traffic demands of the wireless communication devices.

3. The method as claimed in claim 1, wherein the determination is further based on at least one of a number and a type of radio network nodes available for the second set, where type relates to one of more of the following:
if the radio network node is mobile and able to relocate to a second location for said continued serving;
if the radio network node is unable to relocate to a second location for said continued serving; and
radio coverage capabilities of the radio network node.

4. The method as claimed in claim 1, wherein the determination is further based on an algorithm for determining the second locations and wherein the algorithm is based on forming clusters of the wireless communication devices by associating the wireless devices with locations, respectively, related to radio network nodes available for the second set, and determining the second locations using centroids of the formed clusters, respectively.

5. The method as claimed in claim 1, wherein the determination is further based on an algorithm for determining the second locations and wherein the algorithm is based on:
a) providing initial locations associated with radio network nodes available for the second set;
b) associating the wireless communication devices with the closest locations, respectively, associated with the radio network nodes available for the second set; and
c) computing one or more new locations associated with one or more of the radio network nodes available for the second set, respectively, while keeping the association with the wireless communication devices, so that a measure of distance between these new locations and locations of the associated wireless communication devices, is reduced.

6. The method as claimed in claim 5, wherein the algorithm is further based on one or more iterations of b) and c).

7. The method as claimed in claim 1, wherein the method further comprises:
initiating, based on the determination, deactivation of one or more radio network nodes of the first set at the first locations.

8. The method as claimed in claim 1, wherein the second set and the activation relates to one or more radio network nodes that were not part of the first set.

9. The method as claimed in claim 1, wherein the second set relates to one or more radio network nodes that are the same as in the first set.

10. The method as claimed in claim 1, wherein the activation relates to one or more radio network nodes that are the same in the first set and the second set and that are to be moved from their first locations in the first set to other, second locations in the second set.

11. The method as claimed in claim 1, wherein the second set of radio network nodes comprises one or more radio network nodes belonging to fixed locations and activation relates to activation of one more radio network nodes at such fixed, second, locations that differ from the first locations.

12. One or more first nodes for providing radio coverage in a wireless communication network for serving wireless communication devices, the one or more first nodes configured to:
obtain first information relating to current locations of the wireless communication devices that are currently served by a first set of radio network nodes of the wireless communication network, which radio network nodes of the first set are located at first locations, respectively;
determine, based on the obtained first information, second locations of a second set of radio network nodes for continued serving of the wireless communication devices instead of by the first set at the first locations, the second locations differing at least partly from the first locations; and
initiate activation of the second set of radio network nodes at said second locations, to thereby provide radio coverage for the continued serving.

13. The one or more first nodes as claimed in claim 12, wherein the determination is further based on traffic demands of the wireless communication devices.

14. The one or more first nodes as claimed in claim 12, wherein the determination is further based on a number and/or type of radio network nodes available for the second set, where type relates to one of more of the following:
if the radio network node is mobile and able to relocate to a second location for said continued serving;
if the radio network node is unable to relocate to a second location for said continued serving; and
radio coverage capabilities of the radio network node.

15. The one or more first nodes as claimed in claim 12, wherein the determination is further based on an algorithm for determining the second locations and wherein the algorithm is based on forming clusters of the wireless communication devices by associating the wireless devices with locations, respectively, related to radio network nodes available for the second set, and determining the second locations using centroids of the formed clusters, respectively.

16. The one or more first nodes as claimed in claim 14, wherein the determination is further based on an algorithm for determining the second locations and wherein the algorithm is based on:
   a) providing initial locations associated with radio network nodes available for the second set;
   b) associating the wireless communication devices with the closest locations, respectively, associated with the radio network nodes available for the second set; and
   c) computing one or more new locations associated with one or more of the radio network nodes available for the second set, respectively, while keeping the association with the wireless communication devices, so that a measure of distance between these new locations and locations of the associated wireless communication devices, is reduced.

17. The one or more first nodes as claimed in claim 16, wherein the algorithm is further based on one or more iterations of b) and c).

18. The one or more first nodes as claimed in claim 12, wherein the one or more first nodes are further configured to:
   initiate, based on the determination, deactivation of one or more radio network nodes of the first set at the first locations.

19. The one or more first nodes as claimed in claim 12, wherein the second set and the activation relates to one or more radio network nodes that were not part of the first set.

20. The one or more first nodes as claimed in claim 12, wherein the second set relates to one or more radio network nodes that are the same as in the first set.

* * * * *